Patented Feb. 6, 1951

2,540,302

UNITED STATES PATENT OFFICE 2,540,302

VITAMIN-ENRICHED FARINACEOUS MATERIAL

Paul G. Stecher and William R. Jackson, New York, N. Y., assignors to Merck & Co., Inc., Rahway, N. J., a corporation of New Jersey No Drawing. Application March 8, 1946, Serial No. 653,159

4 Claims. (Cl. 99—11)

This invention relates generally to improvements in foodstuffs and in its more particular aspects is concerned with the vitamin-enrichment of certain types of farinaceous foods that are usually cooked by heating in contact with a liquid such as water.

It has now become common to increase the vitamin content of foodstuffs normally containing insufficient amounts of vitamins or to give vitamin properties to foods normally not possessing them by addition thereto of vitamins or vitamin containing materials. One of the most generally used of these additive materials is vitamin $B_1$ (thiamin hydrochloride).

With foodstuffs that are cooked by heating in contact with water or the like, vitamin enrichment by addition of thiamin hydrochloride has been found to be impractical because a large portion of the expensive added vitamin is leached from the foodstuff during the course of the cooking, and thus the cooked material contains a correspondingly diminished vitamin content. In accordance with the present invention, a type of vitamin-enriched foodstuff is provided wherein the additive material is not lost to any appreciable degree during ordinary cooking, thus the cooked product retains approximately 90% of its vitamin potency until it is consumed by the user.

Regarded in certain of its broader aspects, the novel method of preparing vitamin-enriched foodstuffs according to the present invention comprises the addition to the selected foodstuff of a thiamin compound less soluble in water than the hydrochloride but capable of exerting the desired physiological action when the foodstuff is consumed.

While relatively insoluble derivatives, compounds and salts of thiamin may be employed in the practice of this invention, due consideration being given in each instance to the peculiar properties of the selected material making it more or less suitable for the purpose, it is preferred to use a complex of thiamin tannate with methyl cellulose or gelatin, as the additive agent for enriching the farinaceous material. It of course will be apparent to those versed in the art to which this invention pertains, that other thiamin compounds having solubility characteristics of the same order as thiamin tannate complexes can be used if desired for this purpose. The materials selected however, must be non-toxic in the quantities used, must not discolor the product in a manner such that its utility or desirability as a foodstuff is impaired, must permit physiological action of the vitamin when the foodstuff has been consumed, and must be relatively inexpensive or at least not so costly as to preclude its general use in this manner.

To embody the principles of the present invention, a substantially homogeneous mixture of a thiamin compound having low solubility in water and a divided farinaceous material such as semolina, durum flour, etc., is prepared and the thiamin-containing material thus obtained is used in preparation of the selected foodstuff. Among food products of the type to which this invention pertains, and which are usually cooked by heating in contact with a liquid such as water, are noodles, spaghetti, ravioli, macaroni, vermicelli and the like. The enriched foodstuff is cooked in the usual manner, namely, by heating in contact with the liquid such as water, which is subsequently discarded when the material has been sufficiently cooked.

To facilitate a better understanding of the matter of the present invention, specific applications thereof follow, but it is clearly to be understood that these examples are provided by way of illustration, not by way of limitation.

Example 1

A solution of about 12.5 gms. of thiamin chloride in 100 cc. of water is added to about 57.5 gms. of tannic acid in 200 cc. of water. The mixture, cooled in an ice-water bath, is stirred vigorously. Sufficient N/5 sodium hydroxide is added to bring the pH of the mixture from about 4 to 7. As the pH becomes less acid, a soft light tan crystalline precipitate forms. Precipitation is complete when the mixed solutions are neutralized. The precipitate is removed and triturated with 7 gms. of chilled gelatin solution. This reaction is exothermic. As soon as a uniform mix is obtained, 15 cc. of a 5% aqueous tannic acid solution is added and the mixture retriturated. This mixture has a pH of 6.3 to 6.5. The particles in solution become tenacious and then hard and are filtered off and dried in vacuo. The particles, which are light tan or light gray in color, are ground to a fine powder. The thiamin-tannic acid-gelatin complex obtained exhibits an activity equivalent to 12.5% or more of thiamin hydrochloride when assayed by the rat curative method.

About 4.5 parts by weight of thiamin-tannate-gelatin complex are mixed, for instance by milling, with approximately 28.4 parts by weight of flour and the mixture is then incorporated, for example by mixing in a tumbler mixer, in a suitable quantity of flour so as to obtain a uniform product containing the desired amount of active thiamin. The flour thus obtained is used in the manufacture of spaghetti which is cooked by placing the same in heated water until suitable for eating. An assay of the cooked product reveals that, approximately 88% of the thiamin hydrochloride is retained after cooking.

—*Example 2*

About 40 gms. of thiamin tannate crystals are triturated with 10 gms. of methyl cellulose. When a uniform mixture is obtained, 15 cc. of a 5% aqueous tannic acid solution is added and the mixture retriturated. The particles are tenacious and then hard. They are filtered off, dried in vacuo and ground to a fine powder.

Modifications may be made in carrying out the present invention, without departing from the spirit and scope thereof, and the invention is to be limited only by the appended claims.

We claim:

1. A vitamin-enriched farinaceous material containing thiamin-tannate-gelatin complex.

2. A vitamin-enriched farinaceous material containing thiamin-tannate-methyl cellulose complex.

3. A vitamin enriching agent for farinaceous material selected from the class consisting of thiamin-tannate-gelatin complex and thiamin-tannate-methyl cellulose complex.

4. A vitamin enriched farinaceous material containing an enriching agent selected from the class consisting of thiamin-tannate-gelatin complex and thiamin-tannate-methyl cellulose complex.

PAUL G. STECHER.
WILLIAM R. JACKSON.

REFERENCES CITED

The following references are of record in the file of this patent:

UNITED STATES PATENTS

| Number | Name | Date |
|---|---|---|
| 1,964,867 | Allyn | July 3, 1934 |
| 2,328,594 | Williams | Sept. 7, 1943 |
| 2,348,503 | Taylor | May 9, 1944 |
| 2,381,342 | Furter | Aug. 7, 1945 |
| 2,381,343 | Furter | Aug. 7, 1945 |